United States Patent [19]

Ramsey et al.

[11] Patent Number: 4,988,236

[45] Date of Patent: Jan. 29, 1991

[54] POLYMERIC TAPE WITH BIOCIDE

[75] Inventors: Boyd J. Ramsey, Houston; William D. Cameron, Galveston, both of Tex.

[73] Assignee: Reef Industries, Inc., Houston, Tex.

[21] Appl. No.: 523,849

[22] Filed: May 15, 1990

Related U.S. Application Data

[63] Continuation of Ser. No. 221,275, Jul. 19, 1988, abandoned, which is a continuation-in-part of Ser. No. 77,592, Jul. 24, 1987, abandoned.

[51] Int. Cl.$^5$ .............................................. F16L 57/00
[52] U.S. Cl. .................................... 405/157; 116/209; 428/907
[58] Field of Search ................. 405/154, 157; 43/114; 116/209, 211, DIG. 14; 424/405, DIG. 10; 428/343, 344, 346, 907

[56] References Cited

U.S. PATENT DOCUMENTS

| | | | |
|---|---|---|---|
| 2,078,872 | 4/1937 | Pfeiffer | 47/9 |
| 2,449,731 | 9/1948 | Therrien | 285/115 |
| 2,843,068 | 4/1956 | Smith et al. | 111/5 |
| 3,065,605 | 11/1962 | Zitko | 61/72.6 |
| 3,083,542 | 2/1963 | Summers et al. | 61/72.1 |
| 3,115,861 | 12/1963 | Allen et al. | 116/114 |
| 3,282,057 | 7/1961 | Prosser | 61/72.1 |
| 3,327,484 | 6/1967 | Launder et al. | 61/72.6 |
| 3,503,800 | 3/1970 | Eddy | 117/281 |
| 3,504,503 | 4/1970 | Allen et al. | 61/72.1 |
| 3,581,703 | 6/1971 | Hosack | 116/67 |
| 3,633,533 | 1/1972 | Allen et al. | 116/114 |
| 3,639,583 | 2/1972 | Cardarelli . | |
| 3,643,450 | 2/1972 | Stansbury et al. | 61/72 |
| 3,817,042 | 6/1974 | Sanderson | 61/72.6 |
| 4,171,463 | 10/1979 | Watkins | 174/120 |
| 4,310,509 | 1/1982 | Berglund et al. | 424/28 |
| 4,379,655 | 4/1983 | Brost et al. | 405/176 |
| 3,295,246 | 1/1967 | Landsman et al. | 43/131 |
| 4,420,533 | 12/1988 | Preiser et al. | 428/351 |
| 4,584,192 | 4/1986 | Dell et al. | 424/81 |
| 4,623,282 | 11/1986 | Allen | 405/157 |
| 4,683,132 | 7/1987 | Ronning et al. | 424/409 |

FOREIGN PATENT DOCUMENTS

| | | |
|---|---|---|
| 0140797 | 5/1985 | European Pat. Off. . |
| 3329100 | 2/1985 | Fed. Rep. of Germany . |
| 2011769 | 2/1967 | France . |

Primary Examiner—David H. Corbin
Attorney, Agent, or Firm—Vaden, Eickenroht, Thompson & Boulware

[57] ABSTRACT

A polymeric tape intended for use underground near service lines with a biocide incorporated into the polymer. The biocide's presence in the tape after burial discourages vegetative, fungal or other biological growth near the tape. Specifically tree root growth destructive to pipes is prevented. The biocide is incorporated into the plastic tape or the plastic coating on the metallic layer of a detectable tape. The biocide is incorporated in an effective amount to have biocidal activity on the surface of the tape or in increased amounts which leach form the tape.

14 Claims, 1 Drawing Sheet

POLYMERIC TAPE WITH BIOCIDE

This application is a continuation of application Ser. No. 221,275 filed July 19, 1988, now abandoned which application is a continuation-in-part of U.S. Ser. No. 077,592 filed July 24, 1987, now abandoned.

BACKGROUND OF THE INVENTION

The detection of underground pipes and utility lines is a necessity when any construction work involving digging trenches is necessary. Many types of service lines such as telephone and telegraph cables, gas and sewer lines, electrical lines and water mains are located below the surface. It has become increasingly popular to utilize plastic pipe or plastic wrapped cables in this service. Also, ceramic and other nonmetallic materials such as concrete are used in underground service. The precise location of the nonmetallic lines cannot be determined by the metal detectors above ground used to locate metal pipe.

The problem of detection of non-metallic pipes has been addressed in several patents. In U.S. Pat. No. 3,115,861 a frangible colored body is laid underground over the buried service line. The colored body has a water insoluble color and has the benefit of being visible when contacted with solid during digging operations to warn the operator of the proximity of a service line. In U.S. Pat. No. 3,282,057 the use of a colored plastic tape laid over a service line when it was installed was disclosed. The plastic tape is colored and when it is pulled up by a digger, it provides a warning of the proximity of a buried line.

In U.S. Pat. No. 3,504,503 a method was disclosed for locating underground lines of the construction discussed herein which included using a metallic foil with a moisture and soil resistant coating and a coloring to distinguish from the soil. The colored foil frangible body is laid over the service line. The benefit of the foil is that metal detectors can be used to locate the foil and thereby the location of the service line.

In U.S. Pat. No. 3,633,533, a method to locate underground service lines is disclosed using a metal film coated with a colored plastic. The plastic is moisture and soil resistant. In an alternative embodiment a metallic wire is under the plastic coating. The plastic coated foil tape is used quite extensively. There are color codes for water, gas, electric, buried telephone and telegraph lines and other services. The tapes are printed with a cautionary message corresponding to the type of service line underlying the tape. U.S. Pat. 4,623,282 further discloses coloring of warning tapes.

U.S. Pat. No. 4,699,838, discloses a reinforced polymer tape. The tape is strong and has good handling characteristics.

The use of polymeric or plastic tapes has generally been confined to detection of service lines. The tapes have not been used in the area of prevention of tree root damage and other biological damage to service lines.

SUMMARY OF THE INVENTION

The present invention is a polymer tape used for underground burial in connection with a service line that includes an effective amount of biocide. The biocide is used in an effective amount to exhibit biocidal activity on the surface of the tape or, used in an increased amount can leach out of the polymer into the surrounding soil. The tape is laid in the proximity of service lines. The biocidal activity discourages plant growth such as tree roots which invade and block service lines. The biocides can be herbicidal, fungicidal, bactericidal or pesticidal to discourage microbial growth, plant growth or animal tampering in and around the service lines.

The polymer tape with the biocide can be used not only for plastic pipe but also with metallic pipe installation which can be subject to the same problems and pests as plastic pipe. The usage can be the polymer type with or without the colored pigment and warning lettering. The polymer with the biocide can be coated on one or both sides of foil in the typical detectable tape. The invention can be used with any polymer tape construction of polymer coating where a biocide to prevent destruction or tampering is desirable.

The polymer tape with the biocide can be laid above, below or anywhere in the vicinity of service line to be protected. One side of the tape can be coated with a polymer and biocide combination so that the biocide will leach from one side of the tape. The pipe could be wrapped with the tape if desired.

DETAILED DESCRIPTION OF THE INVENTION

Figure 1:
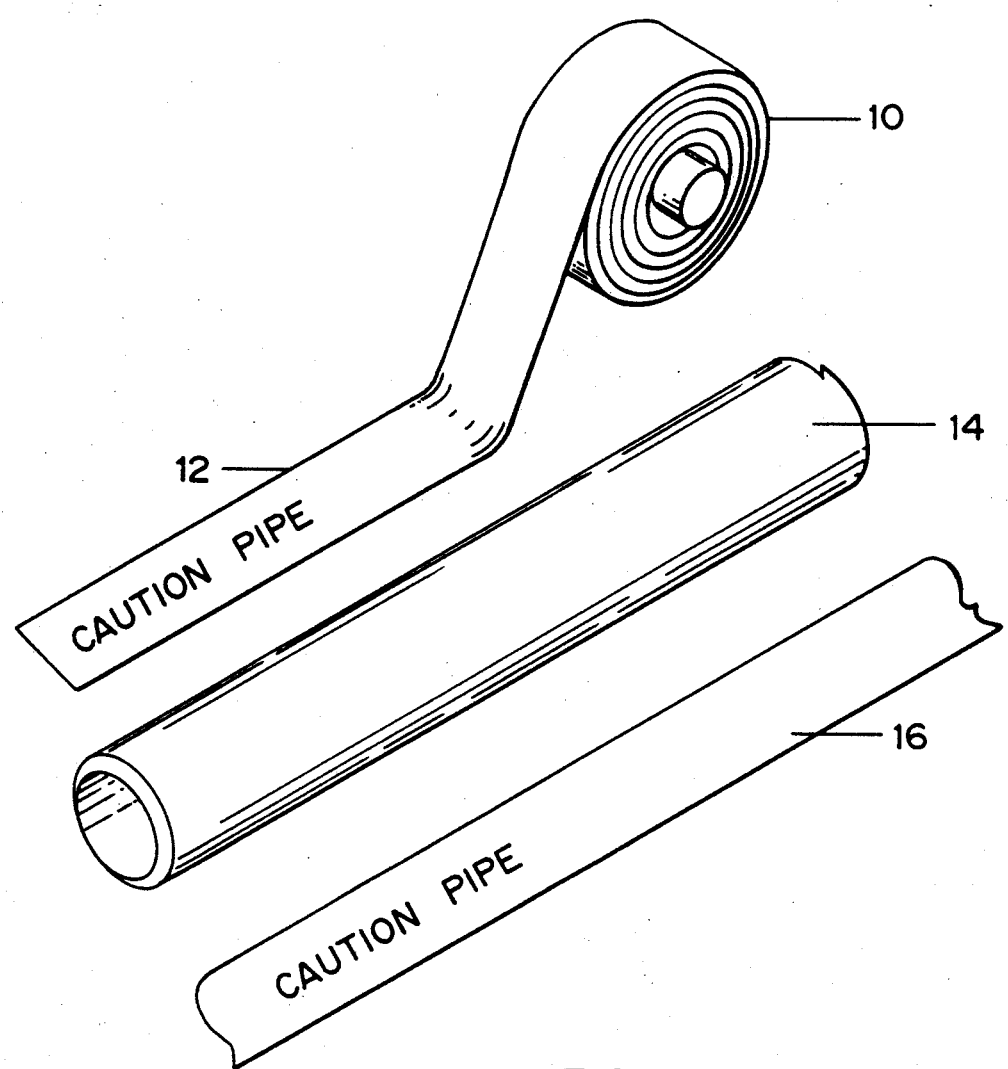

FIG. 1 is a view of a roll 10 of tape 12 being laid over a pipe 14. A line of tape 16 is laid underneath pipe 14. FIG. 1 shows a configuration of two lines of tape 12 and 16 with the biocide laid above and below the pipe 14 to be protected from root invasion and other pests. In the alternative, the tape with the biocide can be wrapped around the pipe, or as many lines of tape as desired can be buried in the vicinity of the pipe or service line to be protected.

The tapes generally carry a printed message of caution that a pipe or cable is buried as shown in FIG. 1. The printed message can include the type of service or any other cautionary message desired. Also, the tapes are color coded according to the service lying under the tape with a particular color generally associated with water, gas, electrical and buried phone lines. The color generally contrasts to the soil so that the tape is visible when digging operations occur to locate the line.

The polymer used in the tape is typically an extruded thermoplastic. The preferred polymers are polyethylene, polypropylene, ethylene vinyl acetate, ethylene acrylic acid or mixtures thereof. The choice of polymer, whether a polar or nonpolar properties are preferred, depends, in part, on the compatibility with the chosen biocide. The color coating is generally in a concentrate extrusion coating resin of one of the polymers composing the tape. The tape can be reinforced with various materials. A polyester scrim of 9 threads by 10 threads per inch made by Burlington was used. Also, the tape can be reinforced with a nonwoven polymeric fabric such as Conwed CC1001 high density polyethylene nonwoven fabric.

The biocide can be chosen from the herbicide, fungicide, bacteriacide or pesticide categories or mixtures of selected biocides. The biocides selected are mixed with the polymers prior to extrusion. The amount of biocides mixed with the polymers depends on the potency and leaching characteristics and leaching desirability of the end product.

For most biocides no more than an 8% by weight to the polymer would generally be used and generally a lower amount for effectiveness. A higher amount of biocide can be used depending on environmental conditions. The biocides that can be used are the available arsenic compounds, organophosphorous compounds, heavy metal compounds, sulfur compounds, tin compounds and other categories of biocides. The polymers in the tape are selected to be compatible with the biocides chosen.

The tape can be a detectable tape with a foil layer of a ductile metal such as aluminum, copper, steel, silver, iron or alloys. The foil layer can be any desired thickness depending on the service of the product with the typical range of between about 0.1 and about 3 mils.

Tapes are typically layered with a foil layer for above ground detectability coated on either side with thermoplastics to provide strength and moisture protection for the foil. A reinforcing layer can be added, as mentioned above, with or without a foil layer. The biocide can be added to any layer of the tape from which the biocide will leach out into the underground environment.

Typically the biocide is in the outer layer of the tape which directly contacts the soil. Biocides are available in a polymeric carrier. One example is Vinyzene® SB-1 PR a concentrate of 10,10'-oxybisphenoxarsine supplied in a polyolefin pelletized resin carrier form. The pelletized form can be mixed and extruded with other polymers. The biocide is 5% to 95% of the carrier. Vinyzene® is also available in 1% and 2% solutions in plasticizers and solvents. The biocide of choice with or without the carrier should be compatible with polymeric layer of the tape.

Some examples of biocides used in the tapes are Zinc Omadine manufactured by Olin Chemical, Zinc Tryithione; and Intercide TMP by Akzochemie America, N-trichloromethylthiophthalimide. These compounds are exemplary of the biocides which can be used in this invention and other biocides may be used.

EXAMPLE 1

A tape without a foil layer was made by a three layer coextrusion process. A core or center layer was extruded with one outer layer containing the biocide. The core layer was composed of 10% linear low density polyethylene, 10% ethylene-propylene-diene rubber, 33% high density polyethylene, 40% polypropylene, 4% ultraviolet stabilizer concentrate prepared by blending a stabilizer such as a hindered amine by 2% into polyethylene, and 3% black pigment of carbon black blended in a polyolefin. The core layer is about 3.2 mils in thickness.

The outer layers are primarily linear low density polyethylene and are about 0.4 mils thick. Both outer layers have 4% of the ultraviolet stabilizer additive. The layer with the biocide contains 4% of Vinyzene® SB-1 PR.

EXAMPLE 2

A reinforced detectable tape was prepared with both outer layers of 96% low density polyethylene and 4% Vinyzene® SB-1 PR. The core was an aluminum foil layer laminated with low density polyethylene to a nonwoven fabric of high density polyethylene.

EXAMPLE 3

The reinforced detectable tape with biocide of Example 2 was duplicated with an outer layer coating of 11% Vinyzene® SB-1 PR and low density polyethylene on one side of the tape. The other outer layer was low density polyethylene without biocide.

The tape of Example 2 was tested for biocide content and 0.22% of 10,10'-oxybisphenoxarsine (OBPA) was detected. Antifungal activity was tested according to ASTM G-21-80 and showed no growth.

The tape of the invention is not only beneficial to locate service lines, but also provides protection for those lines from plant root invasion and blockage, undesirable microbial invasion and growth and other pests. The tape performs this dual service for plastic and non-metallic pipes. For metallic pipe and cables, also subject to the same natural occurring pests, the tape provides a measure of protection against biological attack.

What is claimed is:

1. A polymeric tape for use underground comprising at least one layer of thermoplastic;
   said thermoplastic including a biocide in a sufficient amount for biocidal activity;
   said biocide mixed with the thermoplastic prior to extrusion of the polymer tape; and
   said biocide leachable from said thermoplastic layer to effectively retard biological growth at the surface of the tape and the surrounding soil.

2. A polymeric tape of claim 1 wherein said biocide is selected from the group consisting of arsenic compounds, organophosphorous compounds, heavy metal compounds, sulfur compounds, tin compounds and mixtures thereof.

3. A polymeric tape of claim 1 including a layer of metallic foil laminated to at least one layer of thermoplastic coating.

4. A polymeric tape of claim 1 including a layer of reinforcing fabric.

5. A polymeric tape of claim 1 wherein said layer of thermoplastic is impregnated with a color stable pigment.

6. A polymeric tape of claim 1 wherein said layer of thermoplastic is selected from the group consisting essentially of polypropylene, polyethylene, ethylene acrylic acid, ethylene vinyl acetate and mixtures thereof.

7. A polymeric tape of claim 1 wherein said biocide is selected from the group consisting of biocides compatible with thermoplastics during mixing prior to extrusion including fungicides, herbicides, bactericides and pesticides.

8. A polymeric tape for use underground comprising a center layer of thermoplastic;
   a first outer layer of thermoplastic;
   a second outer layer of thermoplastic mixed with at least 0.2% biocide; and
   said center layer, first outer and second outer layer with biocide co-extruded to form said polymeric tape.

9. A polymeric tape for use underground comprising a core layer of metallic foil;
   said core layer of metallic foil coated on both sides with a thermoplastic layer;
   said thermoplastic layers including at least 0.2% biocide mixed with said thermoplastic layers prior to extrusion;
   said thermoplastic layers further including an ultraviolet stabilizer.

10. A polymeric tape of claim 9 wherein only one of said thermoplastic layers contains a biocide.

11. A polymeric tape of claim 9 wherein said foil layer is laminated to a reinforcing layer of non-woven fabric.

12. A polymeric tape of claim 10 wherein said foil layer is laminated to a reinforcing layer of non-woven fabric.

13. A polymeric tape of claim 9 wherein said thermoplastic layers with biocide are composed of low density polyethylene with at least 0.2% 10,10'-oxybisphenoxarsine.

14. A polymeric tape of claim 10 wherein said thermoplastic layer with biocide is composed of low density polyethylene with at least 0.2% 10,1040-oxybisphenoxarsine.

* * * * *